Aug. 27, 1968    K. E. BURG    3,398,715
SEISMIC UNDERWATER DETECTOR SYSTEM
Filed Dec. 30, 1966    2 Sheets-Sheet 1

INVENTOR
KENNETH E. BURG
V. Bryan Medlock Jr.
ATTORNEY

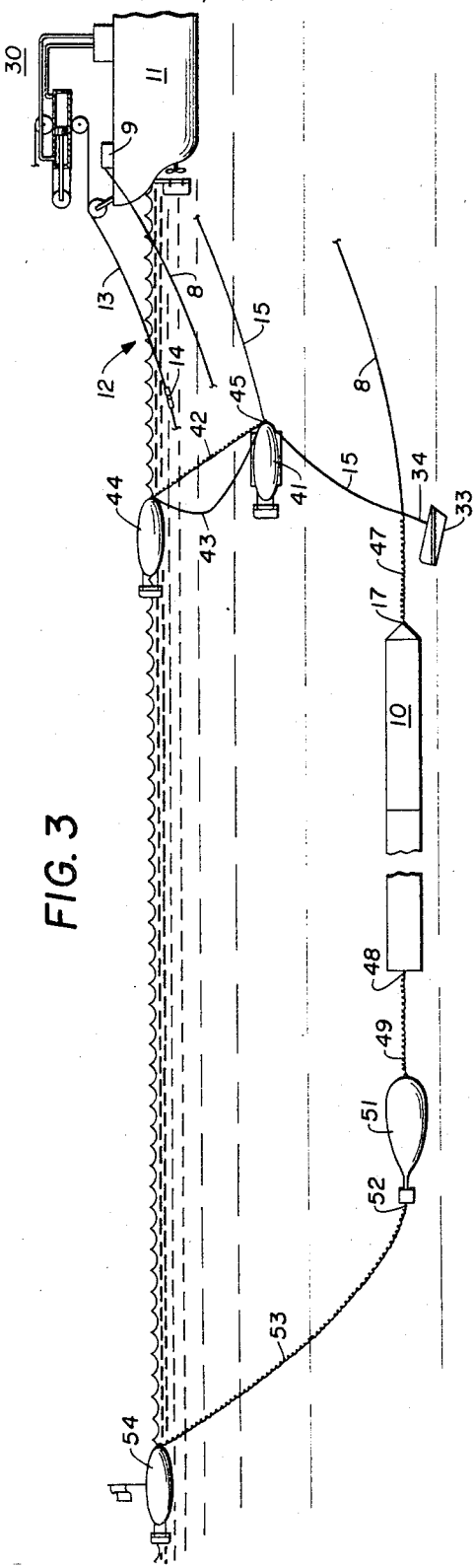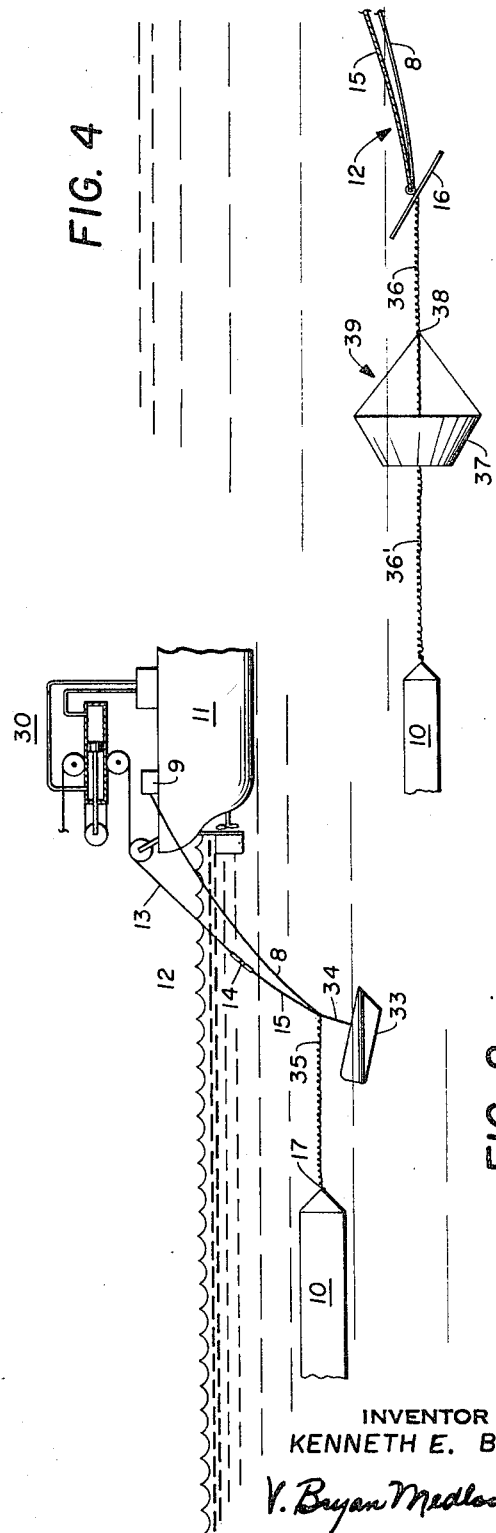

United States Patent Office 3,398,715
Patented Aug. 27, 1968

3,398,715
SEISMIC UNDERWATER DETECTOR SYSTEM
Kenneth E. Burg, Dallas, Tex., assignor to Texas Instruments Incorporated, Dallas, Tex., a corporation of Delaware
Filed Dec. 30, 1966, Ser. No. 606,282
5 Claims. (Cl. 114—235)

ABSTRACT OF THE DISCLOSURE

An improved seismic underwater detector towing system which interposes tensioning means between the ends of a tow line, one end of which is attached to a tow vessel and the other end of which is attached to a neutrally buoyant seismic streamer. The tensioning means is adapted to maintain a constant tension in the tow line to reduce in-line, vertical and transverse movements of the streamer and thereby reduce noise generated by the towing system for permitting more accurate recording of seismic signals.

FIELD OF THE INVENTION

This invention relates to ships, and more particularly to towing apparatus for ships.

THE PRIOR ART

In seismic exploration for petroleum in offshore waters, it is common practice to tow a long, neutrally buoyant detector streamer below the water surface. See, for example, U.S. Patent No. 2,798,211. This streamer consists of a plurality of cylindrical jackets, each of which may contain a plurality of pressure sensitive detectors. Specifically, as many as 40 of these pressure detectors, generally piezo-electric ceramic crystals, are connected together to form a single seismic detector unit with a section of the seismic streamer. Usually 24 or more of these individual cylindrical sections are connected end to end to form a streamer. In order to vary the length of the streamer section, it is common to incorporate inactive sections, also cylindrical in shape, which may be spaced alternately with the active sections in the streamer. The streamer is towed at a preselected constant depth by a towline depressor system behind the ship, usually at a depth from 10 to 60 ft., depending upon the the requirements of the survey. The electrical signals generated by the detectors are conducted to electronic data recording instruments on board the vessel which tows the streamer by means of a plurality of conductors within the tow cable. Usually a buoy is attached to the tail end of the streamer section in order that the end of the section may be observed and to assist in recovery in case of damage to the streamer.

An acoustic sound source, for example, dynamite, gas explosions, an electric spark or the like, creates a seismic acoustic impulse in the water. This impulse penetrates the bottom of the body of water to a depth in excess of 15,000 ft. Portions of the seismic impulse are reflected back to the water surface by the bottom of the body of water and from acoustic interfaces within the earth. These reflection events are recorded as pressure waves by the pressure sensitive detectors within each active seismic streamer section.

The pressure sensitive detectors in each active streamer section record any dynamic change in pressure. Thus, they record noise generated by pressure impulses from sources other than the seismic acoustic source. The seismic presure impulses returning from deep within the earth are very weak and they can be overridden by undesired pressure impulses generated by the towing of the streamer or from any nearby sources. Thus, the quality and usefulness of the seismic data recorded by the seismic system is limited by the signal-to-noise ratio that can be achieved in actual practice. In many cases, the seismic signal is less than 10 microvolts, whereas the noise is from 10 to 100 microvolts.

Research has shown that noises are generated by natural causes, such as rain, wind and waves, soniferous sea creatures, surf and other shore noise, flow noises created by a tied moving over the bottom of the body of water, seismic noise from distant storms and hydrostatic pressure changes due to waves. In addition to natural causes, considerable noises are generated by movement of ships through the water. Such noises are created by turbulence, propeller noise and cavitation, wakes and the like. Still another noise source is the noise generated by the shipboard machinery including engines, shafts, generators, steering mechanism and the like.

A seismic streamer section consists of small pressure sensitive crystals, explained before, together with inert spacers, electrical wires, steel strain members, electrical plugs and electro-mechanical couplings at each end. This complex system is inside a transparent cylindrical polyethylene jacket which in turn is filled with a liquid having a density less than the sea water so that the entire streamer section is essentially neutrally buoyant. The inernal liquid, kerosene, diesel fluid or other such fluid, is in direct contact with the pressure sensitive surfaces of the crystals. Thus, pressure waves in the water are coupled into the crystals by transmission through the internal fluid.

It has also been shown that variations of hydrostatic pressure due to the passage of sea waves over the crystals or due to short period variations in depth of the crystals result in noise. An effort has been made to smooth out these pressure variations by having 20 or more crystals spread out over a distance of 80 to 300 feet. However, it has been found desirable, from operational considerations, to use sections no longer than 100 ft. with a crystal coverage of 80 ft. Under these conditions, it is very desirable to provide means for elimination of short period variations in depth. It has been found that the towing mechanism tends to generate vertical accelerations at the towed end of the streamer due to surges in the towing ship caused by winds, waves, and rudder action. These accelerations cause displacements that travel down the streamer in the form of waves. The noise generated by pressure variations caused by these displacement waves is severe under certain conditions, especially on the streamer sections near the two ends of the streamer. Since these waves tend to travel down the streamer, they have signal-like coherence between the detector groups, and thus are especially undesirable and override the seismic subsurface reflections.

Another source of noise, generated by irregularities in the towing velocity of the streamer, is caused by turbulence over the body of the streamer section. While the detector elements are encased within a smooth plastic tube whose diameter is kept as uniform as possible to reduce noise due to pressure variations caused by flow turbulence, this turbulence is a very unsteady phenomenon. The pressure fluctuations are continually varied due to variations in surface drag at the streamer surface caused by roughness in the surface. The flow noise generated by the turbulent boundary layer of the water contacting the cylindrical body is proportional to the square of the velocity of the body, thus variations of horizontal velocity of the streamer section due to the acceleration at the tow point result in wide fluctuations in boundary layer flow noise.

It has been observed that acceleration of the tow point of the streamer generates electrical noise in both a coherent and non-coherent manner. A streamer contains steel strain members, thus time varying acceleration forces at the tow point are transmitted longitudinally from section to section until the force is dissipated by stretch in the strain members. The conversion of variations in tow force into pressure pulses, that are in turn converted into noise by the pressure transducers, is not fully understood and appears to be a complex process. It has been demonstrated that this type of noise is much less when sea conditions are such that there are no variations in tow force.

A still further source of noise is due to strumming of the tow line or cable. Specifically, since the streamer is towed at a preselected constant depth, through the use of depressers and similar devices, and the point at which the leading end of the tow cable is connected to the towing vessel may vary in height above the sea from 15 to 40 ft., there is a relatively large vertical space between the streamer tow point and the ship tow point which may range from 30 to 140 feet, dependent upon the type of tow vessel and the depth of the streamer. Thus, the tow cable operates at a considerable angle with the sea level, and the movement of the tow cable through the water more or less at right angles to its axis results in a strumming, which generates an acoustic impulse in the water that is picked up by the streamer pressure hydrophones and also introduces a high frequency force into the tow point at the depresser which in turn is transmitted into the streamer members.

In addition to the sources of noise mentioned above, noise is also generated by the marker buoy which is towed from the tail end of the streamer to permit a visual inspection of the location of the end of the streamer and to provide additional buoyancy to prevent loss of the streamer and the tow cable if the cables break or are destroyed. This marker buoy is acted upon by waves, wind and currents and by towing forces. Variations in these phenomena generate variations in the towing force which in turn are transmitted to the tail end of the streamer. These forces act in the manner similar to those described above in discussing the forces acting upon the tow point of the streamer, both of which forces generate noise in the crystal hydrophones.

SUMMARY

The invention may be generally described as a seismic underwater detector towing system in which the surface vessel tows a neutrally buoyant seismic streamer by means of a tow line connected at one end to the vessel and at the other end to the streamer which also includes the improvement of ram tensioning means interposed between the ends of the tow line and adapted to maintain a constant tension in the tow line thereby reducing vertical and transverse movements of the streamer and concomitantly reducing noise generated by the towing system.

THE DRAWINGS

FIGURE 2 is also a somewhat schematic side elevational view of yet another embodiment of the invention;

FIGURE 3 is a side elevational view in yet another embodiment of the invention;

FIGURE 4 is a side elevational view of still another embodiment of the present invention.

THE PREFERRED EMBODIMENTS

Figure 1:
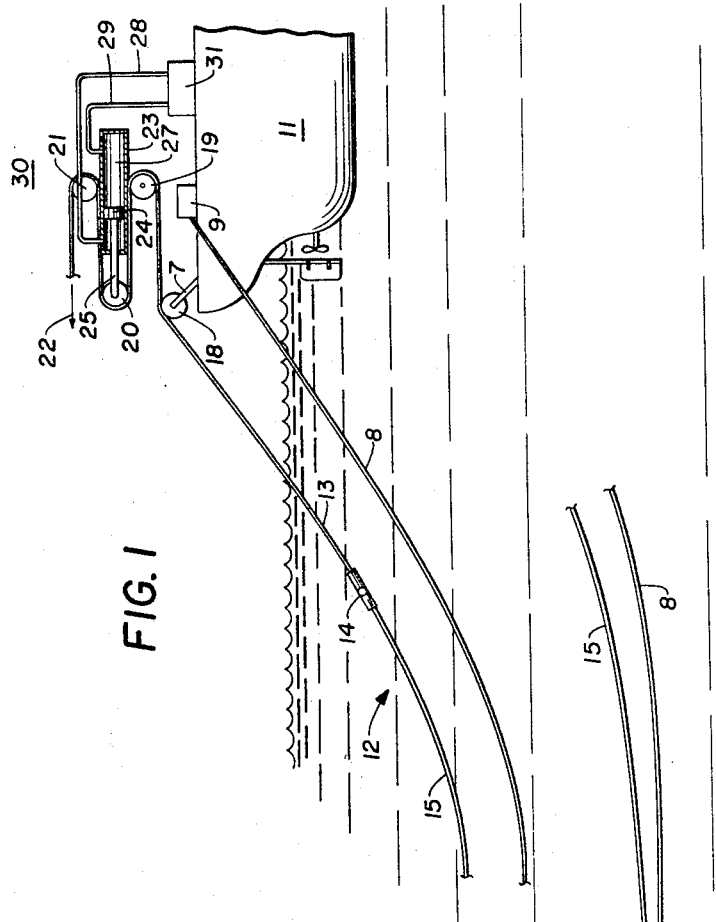
FIGURE 1 is a somewhat schematic view in side elevation of an underwater detector system embodying the present invention.

With reference to FIGURE 1, a conventional streamer 10 is towed behind a vessel 11 by a conventional towline 12. Towline 12 may be comprised of a steel cable 13 connected through swivel 14 to a nylon or propylene section 15 to which is attached a depressor 16. Depressor 16, schematically illustrated as an inclined plate, may take various forms, the common and simplest form of which will comprise lead weights disposed around towline 12 proximate the tow point 17 of streamer 10. Towline 12 is reeved through a "ram tensioner" 30, such as manufactured by Western Gear Corporation, Everett, Wash. Specifically, cable portion 13 of towline 12 is reeved over sheaves 18, 19, 20, and 21, respectively, and its free end 22 may be secured to a conventional cable drum (not illustrated) provided on vessel 11 for dispensing and reeling in of tow line 12.

Sheave 18, as illustrated, is secured by a brace 7 to the stern of vessel 11. Sheave 19, about which cable portion 13 of towline 12 passes, as explained above, is adapted to rotate at its center about an axis which is perpendicular to the intended direction of movement of streamer 10 and fixed relative to vessel 11. Sheave 19 may be fixed relative to vessel 11 by mounting it upon a pin secured to a support member (not illustrated) carried by vessel 11. Sheave 20, about which cable portion 13 of towline 12 next passes, is positioned above and rearwardly of sheave 19, and sheave 21 is positioned forward of and above sheave 20. Sheave 21, like sheave 19, is adapted to rotate about an axis which is perpendicular to the intended direction of movement of streamer 10 and fixed relative to vessel 11 by mounting sheave 21 on a pin carried by structure (not illustrated) affixed to vessel 11. Positioned intermediate sheaves 19 and 20 is a hydraulic cylinder 23 reciprocally mounted within which is a ram 24, to end 25 of which sheave 20 is rotatably attached. Ram 24 effectively divides cylinder 23 into chambers 26 and 27, which communicate through conduits 28 and 29, respectively, with fluid and/or gas reservoir 31. Signals from streamer 10 are transmitted through electrical cable 8 to conventional recording equipment 9 about vessel 11.

With reference to FIGURE 2, which illustrates yet another embodiment of the invention, the conventional streamer 10 has its tow point connected through towline 12 to vessel 11, the cable portion 13 of towline 12 passing around ram tensioner 30 in the same fashion as described above in connection with FIGURE 1 embodiment. Cable portion 13 of towline 12 is connected through swivel 14 to a nylon or propylene rope section 15 to which is connected a "V-FIN" 33, such as illustrated in U.S. Patent 3,137,264. V-FIN 33 is connected to towline 12 through cable 34 attached thereto or other suitable means. Between V-FIN 33 and tow point 17 of streamer 10, towline 12 includes a conventional stretch section 35. Stretch section 35, is a coaxial cable adapted to lengthen and shorten in response to increased or decreased, respectively, forces in towline 12, to minimize the strain generated in conventional steel tow lines. One form of stretch section 35 comprises a nylon core element around which is helically disposed the electrical conductors from streamer 10. The core and conductors are coated with a protective layer of rubber or the like. The electrical conductors are carried by cable 8 to the recording equipment 9.

With reference to FIGURE 3, one end of towline 12 is reeved over the sheave of ram tensioner 30 in the same manner as described in connection with FIGURE 1, and its cable portion 13 is connected through swivel 14 to a nylon rope 15 which is in turn connected to a first subsurface fish 41. Subsurface fish 41 is connected through stretch section 42 and safety line 43 to a first surface fish 44. Rope 15, after being connected to tow point 45 of subsurface fish 41 passes downwardly where it is connected to cable 34 of the V-FIN 33. Also connected to the connecting point of rope 15 and cable 34 is a coaxial stretch section 47, portion 8 of which is connected with the recording equipment 9 aboard vessel 11. Coaxial stretch section 47 is connected to a tow point 17 of streamer 10, the tailing end 48 of which is connected through stretch section 49 to a neutrally buoyant subsurface fish 51. Fish 51 is in turn connected at its trailing end 52 through a stretch section 53 with a surface marker buoy 54.

FIGURE 4 illustrates yet another apparatus which may be incorporated in the FIGURES 1–3 embodiments and towed behind vessel 11. The FIGURE 4 embodiment comprises a streamer section 10 connected through towline 12 to the vessel 11 (not illustrated in FIG. 3). Towline 12 includes a coaxial stretch section 36, to which electrical conductor 8 is attached and a nylon rope portion 15 to which is secured a depressor 16. Stretch section 36 is connected to a sea anchor 37 at its tow point 38 and passes centrally of sea anchor 37 for attachment to tow point 17 of streamer 10. Sea anchor 37, as illustrated, is a hollow body having frusto-conical section in the form of a wind sack and a bridle 39 for attachment to stretch section 36.

Figure 5:
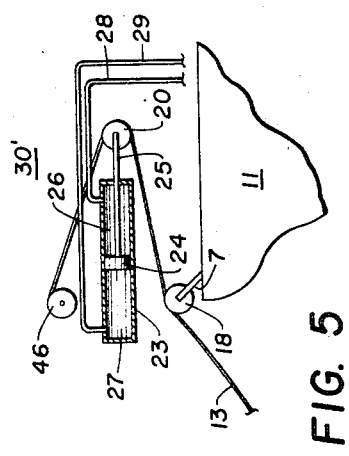
FIGURE 5 is a schematic view of an alternative tensioning means which may be used with the present invention.

FIGURE 5 serves to illustrate an alternative ram tensioner 30', which may be used in place of ram tensioner 30. In FIGURE 5, the cylinder 23 and ram 24 of ram tensioner 30 are used, but the direction of the assembly is reversed. The cable portions 13 of towline 12, after passing over sheave 18 supported by brace 7 of vessel 11 is reeved over sheave 20 onto towline storage drum. Sheave 20 is rotatably attached to the end 25 of ram 24, and the conduits 28 and 29, communicating with chambers 26 and 27, respectively, also communicating with a fluid reservoir like reservoir 31, illustrated in FIGURE 1.

In operation, the embodiment of the invention illustrated in FIGURE 1, because of its simplicity, is preferred for use in a normal smooth to rough sea. A normally rough sea will cause gyrations in the movement of vessel 11 which absent ram tensioner 30 would be transmitted through tow line 12 to streamer 10 causing noise generation.

With ram tensioner 30, however, the tension in tow line 12 will be maintained relatively constant.

Ram tensioner 30 is a passive device capable of compensating for changes in force or pressure. Any increase in the force on tow line 12 will cause increased force on sheave 25 tending to drive ram 24 to the right thus letting out more line to relieve the force.

Conversely, if the force on tow line 12 lessens, the fluid in chamber 27 will force ram 24 to the left to take up tow line 12 and increase the tension on tow line 12. Ram tensioner 30' operates in a similar manner. An increase in force on tow line 12 will drive ram 24 to the left to let out line, and a decrease in pressure will permit ram 24 to move to the right to take up line. Thus, changes in the velocity of movement of vessel 11 will be compensated for by either of the ram tensioners 30 and 30' to maintain a constant tension in tow line 12.

Ram tensioners 30 and 30' are characteristic of a class of devices capable of maintaining constant tension in a line irrespective of gyrations in the towing vessel, unless they become quite severe.

In certain offshore areas, such as the North Sea, Pacific Northwest, and Alaska, storms are much more prevalent than in many areas, and the sea state is therefore higher and more turbulent. Under such conditions, if the vessel moves vertically or laterally due to severe wave action, the tension in the two line 12 may remain essentially constant due to the use of the ram tensioner 30 but a displacement wave travels down the tow line 12 which is not counteracted by the depressor 16, causing the depressor to dart or surge upward, downward and from side to side. This movement of the depressor 16 generates a displacement wave that travels down the streamer as it glides through the water. Thus, noise is generated due to changes in the hydrostatic pressure along the streamer, due to change in the boundary layer turbulence over the streamer sections, and due to variations in tension of the strain members and other phenomena not well understood. Under such conditions, the embodiments of the invention illustrated in FIGURES 2 and 3 are preferred over the embodiment illustrated in FIGURE 1. In the FIGURE 2 embodiment, for example, the tow line 12 has connected thereto between the ram tensioner 30 and the streamer 10 a V-FIN described above. The V-FIN is engineered to tow through the water with a minimum of turbulence in a highly stable manner, and is highly resistant to lateral and vertical displacement due to gyrations of the tow cable 12. The V-FIN, when subjected to variations in vertical and lateral components of tow force caused by gyrations of vessel 11, acts as a solid body in the water due to large hydro-dynamically designed surfaces. Thus, the streamer 10 is isolated from the gyrations of the tow point by the V-FIN. V-FIN 33 cannot be used for this purpose without the ram tensioner 30, or a similar accumulator device because the forces in the tow cable 12 resulting from uncompensated motion in the vessel 11 will either break the tow cable or will destroy the V-FIN 33. The embodiment illustrated in FIGURE 2 is particularly effective in seas where the wave period is short or where the wave pattern is choppy or complex.

In heavy sea conditions where the waves are high, but relatively free of chop and have a long period or wave length, the V-FIN is not as effective. While a V-FIN strongly resists rapid fluctuations in the tow force, it has less resistance to slow, relatively smooth fluctuations such as encountered when the period of the sea surface is great. To compensate for these conditions, the embodiment of the invention illustrated in FIGURE 3 is preferred. In the FIGURE 3 embodiment, a highly streamlined submerged float 41 with buoyancy nearly equal to the downward force generated by the V-FIN 33 is inserted in the tow line 12 so that it runs below the deepest wave trough, perhaps 5 to 15 feet below normal seal level. Additional buoyancy is supplied by a surface float 44 that is attached to submerged float by a stretchable tow line 42 such as bungy or airplane shock cord, nylon rope or similar material. A small steel safety line 43 is attached between the floats 41 and 44 to prevent loss of either should tow line 15 or tow line 42 break. In the FIGURE 3 embodiment, the tow line 12 between the vessel and the submerged float 41 is essentially horizontal, and since the float is a considerable distance behind the vessel, the vertical or lateral forces applied to the float and hence to the V-FIN 33 are much smaller than similar forces applied to the V-FIN 33 when it is towed directly from the vessel, as illustrated in FIGURE 2. The effect of vertical displacement of the sea surface during passage of a long period wave upon the V-FIN 33 of FIGURE 4 is significantly reduced by the combination of submerged and surface floats. As a wave crest approaches the float system, the surface float tends to ride up and forward and to stretch the stretchable member. Since it does not supply much buoyant force, the fluctuation of the vertical force it applies to the submerged float is minor. Thus, the passage of a high amplitude, long period wave introduces very little fluctuation of vertical or lateral forces to the V-FIN 33.

In the use of the ram tensioner 30 with a depressor such as illustrated in FIGURE 1, a V-FIN such as illustrated in FIGURE 2, a V-FIN and floats such as illustrated in FIGURE 3, or any other type of tow system, high frequency variations and tow forces exist to varying degrees, depending upon sea state, boat speed, and upon the system used. Strumming of the tow cable 12 takes place which generates acoustic noise and high frequency mechanical forces. It is common practice to reduce these high frequency fluctuations and tow force by the use of stretchable members in the streamer section between the active sections of the streamer and the depressor system. These stretchable members are effective only under certain conditions and they provide no means for damping out vertical and lateral high frequency forces. To eliminate the in-line high frequency force variations and to provide insulation from high frequency lateral forces, the apparatus illustrated in FIGURE 4 may be used in connection with each of the embodiments of FIGURES 1, 2 and 3. With reference to FIGURE 4, the vibrations generated by the depressor 16 of FIGURE 1 embodiment, for example, are isolated from the streamer 10 by insertion of an equivalent mass between the depressors 16 and the streamer 10 in the form of a sea anchor or drogue 37. To damp even further vibrations, a mechanical engineering technique is employed. Specifically, one mechanical engineering technique used to eliminate vibration involves connecting the body from which vibration is to be eliminated to a first spring member. The spring member is connected to an equivalent mass, which is in turn connected by yet another spring member to the source of vibration. In the embodiment illustrated in FIGURE 4, the streamer is equivalent to the mass from which vibration is to be eliminated, the stretch section 36' is equivalent to the first spring, the sea anchor 37 is equivalent to the second mass, and the stretch section 36 is equivalent to the second spring which is attached to the source of vibration, namely the tow line 12. By judicious selection of the stretch sections 36' and 36, as well as the size of the sea anchor 37, high frequency vibrations can be isolated from the streamer 10. While the sea anchor 37 is one means for acting as an equivalent mass, others could also be employed. For example, one type of mass could consist of a large hydrodynamically streamline plastic chamber with a buoyant section to supply buoyancy equal to its weight in water. The remainder of the chamber upon immersion is filled with sea water which enters through a plurality of apertures about the surface of the chamber. Such chambers can be made to contain several tons of water when immersed, but are nevertheless neutrally buoyant. The use of such a device would therefore supply an equivalent mass of several tons and will be sufficient to serve as an effective vibration damping mass between the depressor and the streamer. The sea anchor or its equivalent is effective to damp lateral and vertical vibrations because such forces are consumed in acceleration of the water volume contained in the sea anchor and are not transferred to the streamer.

The same principle can be employed to the isolation of vibration from the marker buoy, such as illustrated in FIGURE 3. The marker buoy attached to the tail end of the streamer couples noise into the streamer due to strumming of the cable and wave action on the buoy. The vibrations are significantly reduced by an isolation system comprising a stretch section 53 connected through a subsurface neutrally buoyant fish 51, or a sea anchor such as sea anchor 37 in FIGURE 4, which acts as an equivalent mass, which is in turn connected through a stretch section 49 to the streamer 10. The subsurface fish 51 can contain a mass of water sufficient to absorb the tugging of the stretchable member leading to the marker buoy 54.

After a reading of the above various other modifications can be visualized by those skilled in the art, and while rather specific terms have been used in describing several embodiments of the present invention, they should should not be construed as a limitation upon the invention as defined by the following claims.

What is claimed is:
1. In a seismic underwater detector towing system wherein a surface vessel tows a neutrally buoyant seismic streamer by a towline connected at one end to said vessel and at the other end to said streamer, the combination comprising:
(a) tensioning means interposed between the ends of said towline and adapted to maintain a substantially constant tension in said towline to reduce movements of said streamer to thereby reduce noise generated by the towing system,
(b) a first neutrally buoyant subsurface fish connected to said towline between said tensioning means and said streamer,
(c) a first surface fish,
(d) a first elastic cable connecting said surface fish to said subsurface fish to maintain said subsurface fish at a shallower depth than said streamer,
(e) paravane means connected to said towline between said subsurface fish and said streamer,
(f) a second neutrally buoyant subsurface fish,
(g) a second elastic cable connecting the trailing end of said streamer to said second neutrally buoyant subsurface fish,
(h) a second surface fish, and
(i) a third elastic cable connecting said second subsurface fish to said second surface fish.

2. The system defined in claim 1 wherein tensioning means comprises:
(a) three spaced apart sheaves, two of said sheaves mounted for rotation about axes which are perpendicular to the intended direction of movement of said streamer and which are fixed relative to said vessel,
(b) a ram and cylinder, one of which is fixed relative to said vessel and the other of which is connected to one of said sheaves for reciprocal movement along a line parallel to the intended direction of movement of said streamer,
(c) said towline being reaved around said three sheaves, and
(d) means responsive to the force exerted by said towline to move the reciprocating member of said ram and cylinder to take up or let out towline to compensate for a lessening or increase, respectively, in the force exerted by the towline.

3. In a seismic underwater detector towing system wherein a surface vessel tows a neutrally buoyant seismic streamer by a towline, the combination comprising:
(a) tensioning means interposed between the ends of said towline for maintaining a generally constant tension in said towline to reduce movements of said streamer and to reduce noises generated by the towing system,
(b) paravane means connected to said towline between said vessel and said streamer for providing resistance to lateral and vertical displacement of the towline, and
(c) a line having substantially greater elasticity than said towline connected between said paravane means and said streamer to isolate said streamer from vibrations in said towline.

4. The system defined in claim 3 wherein said paravane means has a substantially V-shaped cross section to provide positional stability underwater.

5. The system defined in claim 3 and further comprising a frusto-conical sea anchor connected to and surrounding said line intermediate the ends thereof to act as an equivalent mass for reducing vibrations imparted to said streamer.

References Cited

UNITED STATES PATENTS

| | | | |
|---|---|---|---|
| 1,133,154 | 3/1915 | Kahnweiler | 114—209 X |
| 2,414,480 | 1/1947 | Morrill | 114—235 |
| 2,632,150 | 3/1953 | Silverman et al. | 114—235 X |

FOREIGN PATENTS 1,266,466  6/1961  France.

MILTON BUCHLER, *Primary Examiner.*

TRYGVE M. BLIX, *Assistant Examiner.*